United States Patent [19]

Shanaberger

[11] Patent Number: 4,723,976
[45] Date of Patent: Feb. 9, 1988

[54] METHOD AND APPARATUS FOR PRESSING GLASS CATHODE RAY TUBE FACEPLATES

[75] Inventor: David Shanaberger, Trucksville, Pa.
[73] Assignee: Owens-Illinois Television Products Inc., Toledo, Ohio
[21] Appl. No.: 892,162
[22] Filed: Jul. 30, 1986
[51] Int. Cl.⁴ .............................................. C03B 11/16
[52] U.S. Cl. .......................................... 65/29; 65/81; 65/160; 65/163; 65/318
[58] Field of Search ................ 65/81, 85, 29, 160, 65/163, 318

[56] References Cited

U.S. PATENT DOCUMENTS

| | | | |
|---|---|---|---|
| 3,607,194 | 9/1971 | Ayers | 65/318 X |
| 3,634,060 | 1/1972 | Dahlman et al. | 65/318 X |
| 3,953,187 | 4/1976 | James | 65/81 X |
| 4,613,352 | 9/1986 | Krumme et al. | 65/160 X |
| 4,623,375 | 11/1986 | Cardenas-Franco et al. | 65/160 X |

Primary Examiner—Arthur Kellogg
Attorney, Agent, or Firm—H. G. Bruss

[57] ABSTRACT

A method and apparatus for pressing glass TV tube faceplates employing a microprocessor controlled ram and plunger operated with open loop position based speed control at relatively high rates of motion when the plunger is not in critical contact with the glass, at uniform speed as the plunger enters the glass and at closed loop pressure control after the viewing region of the cavity for the faceplate between plunger and mold has been filled out at uniform plunger pressing speed. Pressure control is employed to ramp pressure down to a pressing dwell pressure and maintain that pressure.

6 Claims, 4 Drawing Figures

METHOD AND APPARATUS FOR PRESSING GLASS CATHODE RAY TUBE FACEPLATES

This invention relates to a method and apparatus for pressing glass cathode ray tube faceplates and more particularly to the technique and means of pressing molten glass gobs at high rates of production to high standards of optical and mechanical quality.

The faceplates of television picture tubes in the viewing area have particularly demanding optical quality requirements and since such faceplates must be sealed to another envelope part, their mechanical dimensions are also critical, particularly with respect to the seal edge on the flange surrounding the viewing area. Not only must the glass be of high quality, free of bulk defects, it must also be free of optical defects in the viewing area.

Faceplates are produced on high speed machines by pressing a plunger or male mold into a female mold which may be of one or more parts. The equipment for such production is adaptable to different shapes of product, different sizes of product and different tooling, such as the plunger and mold. Thus its pattern of operation must be adaptable to these changes. For example, a machine set up for faceplates for thirteen-inch tubes might run at a rate of eight gobs per minute while a set up for twenty-seven inch tubes will run at three and one-half gobs per minute. These time variations are limited primarily by the pressing cycle required to set up the pressed glass and achieve the requisite product quality.

In the machine set up it is desirable to maintain consistent processing parameters, that is, avoid drift of such parameters, and to consistently establish those parameters on set up so that product is reproducable from run to run. Further it is desirable to minimize job set up time. In particular, in the molten glass pressing operation it is important to establish with precision both ram motion and pressure in order to achieve high product quality and speed of operation.

An object of this invention is to improve pressed glass faceplates for cathode ray tubes. Further objects are to improve the pressing method and apparatus for such faceplates with respect to control, reproducibility, production rates, controlled changes, and isolation of changes of one parameter from the other parameters. Other objects are to minimize or eliminate optical defects previously introduced by the pressing process.

A feature of this invention is a controlled pressing ram operation as to velocity and pressure which minimize transit time of the ram while it has no effect on the glass being pressed and controls the glass in an improved manner and at maximum speeds when the plunger it drives is in contact with the glass. Control is by open loop ram speed control through the preponderance of the non-critical portions of its operation and in closed loop pressure control during critical portions of the plunger contact with glass and a transition between the two controls with product disruptive effects minimized. A pressing cycle is initiated by advance of the ram and plunger toward a mold and molten glass charge therein at a high rate, a stepped position based transition to a low rate to a constant speed prior to glass-plunger contact, the continuation of that constant speed as glass is distributed over the viewing region of the cavity between the plunger and mold to distribute the glass without generating waves therein and a shift to closed loop pressure control when the ram pressure has built to a level indicating the viewing region has been filled. In the closed loop pressure control, pressure is reduced at a controlled rate in one or more rate steps and when pressing dwell pressure has been reached, the pressure is maintained for a program defined pressing dwell interval.

Rapid withdrawal from the pressed glass of the plunger carried by the ram is accomplished under open loop speed control, the ram is slowed to a stop and held at the end of its retraction stroke and is held in its retracted position by this speed control which is position based.

The system is adaptable to a predetermined and adjustable plurality of positions, speeds, pressure control values, and pressure rates of change to provide flexibility of control.

In accordance with the present invention, pressing ram control is by a servo control employing a sequence of steps of advance from a high speed, to a moderate speed, and to a low speed determined by the position of the ram. As the ram driven plunger enters the glass in the mold at a constant low speed it builds pressing pressure as it displaces the gob to distribute glass over the viewing face of the faceplate. When the pressure is at a level indicating the viewing face portions of the mold are filled with glass, the servo control of the ram is shifted to pressure control and ram pressure is reduced at a rate which mitigates against chatter and the introduction of optical defects in the viewing face of the faceplate. The reduced rate of application of pressure completes the distribution of the glass within the cavity between the mold and plunger and maintains their intimate contact with the glass at a pressing dwell pressure to extract heat from the glass. At the end of the pressing dwell interval the plunger is rapidly withdrawn from the glass and mold under speed control such that the ram is decelerated at a slowdown distance from the raised position. The control affords rapid displacement and thus minimum lost time when the plunger is not pressing and/or cooling the glass and smooth motion during glass distribution over the optically critical portions of the faceplate by constant ram speed followed by a smooth transition into pressure control.

A programmable controller permits the number of steps of control and the ram speed to be set, the transition pressure to initiate pressure control of ram pressing and to set the rate of change of pressure and any pressure levels at which such rate is to change. Final pressing pressure, the principal adjustment factor employed by machine attendants, can be manually set. The system thus lends itself to rapid and repeatable job changes and maintains pressing uniformity. Further the plunger speeds and pressure transitions are maintained when adjustments are made in final pressing pressure.

The above and additional objects and features of this invention will be appreciated more fully from the following detailed description when read with reference to the accompanying drawings in which.

Figure 1:
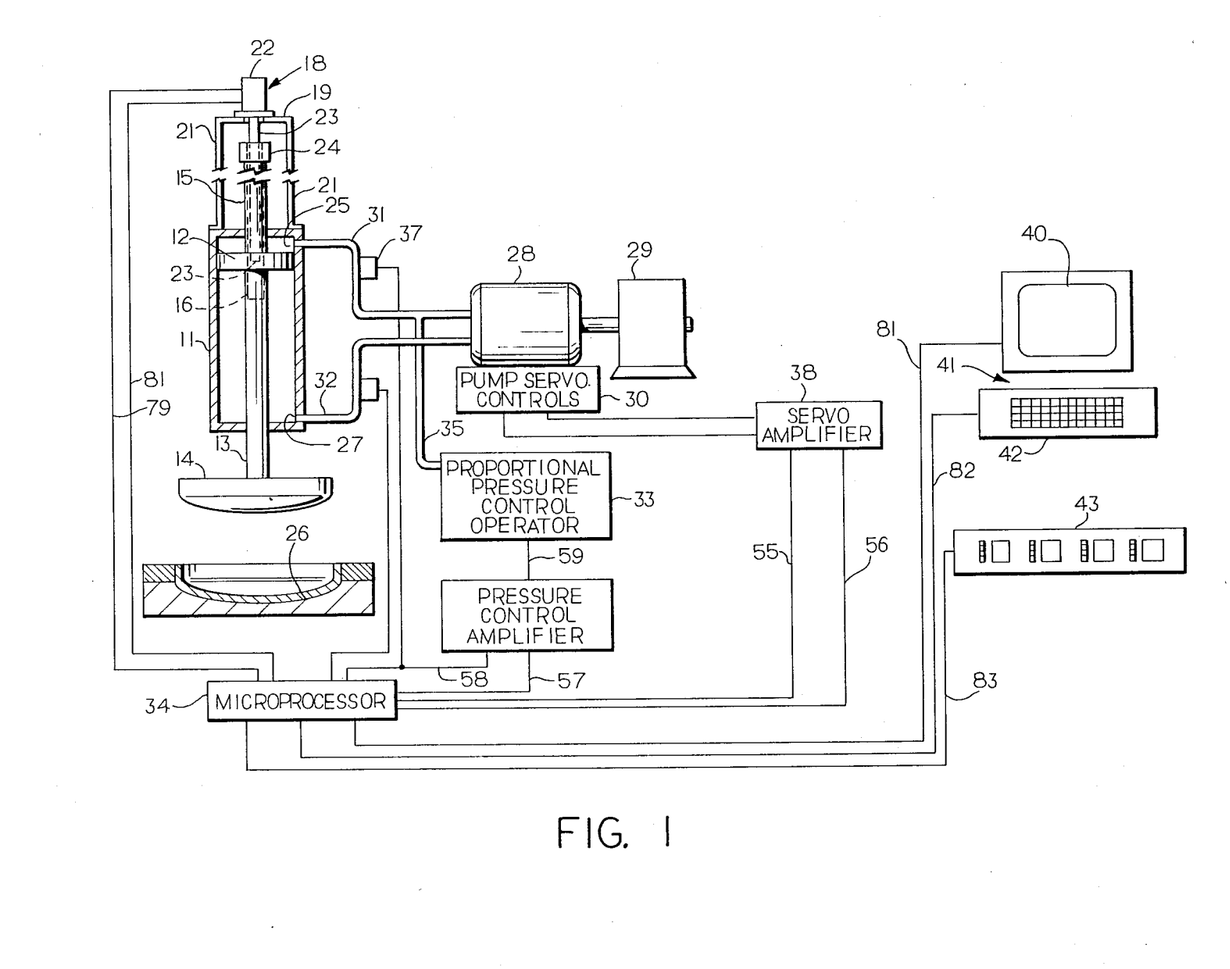
FIG. 1 is a simplified schematic and block diagram of an electrohydraulic pressing ram system of this invention.

FIG. 1 discloses an electro hydraulic system for pressing glass cathode ray tube (CRT) faceplates in schematic form. One utilization of such a system is in conjunction with a forming shop (not shown) which includes a glass melter and refiner, a forehearth and a feeder for providing charges of glass to female molds for CRT faceplates in the form of sheared gobs. The molds are carried on an indexing table as a series arrayed in a circle around the axis of rotational index of the table and are passed through a series of stations as the table is indexed including a gob charging station or feeder, a pressing station to which this system applies, a series of cooling stations and a takeout station all arranged around the circular array. From the takeout station the pressed CRT faceplates are conveyed to after-processing equipment which may include machines for inserting studs in the sidewalls of the faceplates and machines for loading the faceplates into annealing lehrs.

Typically a forming shop runs continuously so that glass is conditioned, passed to a feeder, fed to the mold as sheared gobs, indexed by the press table to a pressing station, a series of cooling stations, and a takeout, then conveyed to the afterprocessing. Gobs and faceplates pressed from the gobs are processed as a sequence of glass masses which are each simultaneously subject to one of the processing steps. Thus each step of the process is performed in a time interval which accommodates and is coordinated with the other process step intervals. A significant portion of the press forming of CRT faceplates is the time of dwell of the male and female mold element in contact with the glass since short dwell will not establish the desired shape of the faceplate due to the failure to extract sufficient heat from the glass through the mold parts and a long dwell introduces stresses in the glass which are not tolerable in subsequent processing. Pressing dwell time thus can be a limiting factor in the sequence of operations in the shop.

The faceplate pressing operation involves the transfer of the plunger or male mold from a retracted position clear of the mechanism indexing the table and female mold, through an advance to the gob in the female mold, the further advance to distribute the glass throughout the cavity between the plunger and mold, the pressing dwell time, and the retraction for transfer of the pressed glass and its mold from the pressing station and the indexing of the next mold and gob to be pressed into registry with plunger pressing travel. High speed operation of the shop dictates rapid transfer of the plunger between its retracted position and glass contact. Product quality considerations dictate a controlled plunger motion and pressure while in contact with the glass.

The system as shown in FIG. 1 comprises a hydraulic cylinder 11 containing a piston 12 to which is secured a ram 13 mounting a plunger 14 or male CRT faceplate mold. An upper piston rod 15 extends through the upper end of cylinder 11 and has a central bore 16. A linear displacement transducer (LDT) 18 such as the ultrasonic transducers of the DCTM series made by Tempo Instrument, Inc., Plainview, N.Y. 11803, is mounted on a crosshead 19 supported by adjustable brackets 21 on the top of cylinder 11 so that its receiver 22 supports transducer beam 23 coaxial of the piston rod 15 and extending into bore 16. A positioning head 24 is mounted on the end of piston rod 15 and slides on the transducer beam 23 as the piston rod-piston-ram and plunger are moved coaxial of cylinder 11. The positioning head 24 produces signals representative of the length of beam 23 between receiver 22 and positioning head 24 and thus ram and plunger position as determined by the extension of retraction of ram 13 in cylinder 11.

Piston 12 is driven downward by introducing hydraulic fluid into cylinder 11 at port 25 above the piston to drive plunger 14 toward mold 26 which may be mounted on an indexing table (not shown) which indexes mold 26 to processing stations of a pressing apparatus including a gob feeding station to supply gobs of molten glass to a mold 26 preceding its index to the pressing station. Bottom port 27 provides the means to introduce hydraulic fluid below piston 12 to raise ram 13 and plunger 14.

Hydraulic fluid is forced through the system by a radial piston pump 28 such as a D type unit by the Oilgear Company, 2300 South 51$^{st}$ Street, Milwaukee, Wis. 53219, having an Oilgear type V-W electrohydraulic servo control 30. In such units an electrohydraulic torque motor and servo valve control the position of a slide block which controls the pump stroke and pumping direction (all by means not shown) and thus controls the throughput of hydraulic fluid. In operation the pump rotor (not shown) is continuously driven by motor 29.

With pump in the neutral state, no hydraulic fluid is issued. When set to drive the ram upward, suction is imposed on conduit 31 to top port 25 and pressure is imposed on conduit 32 to the bottom port 27 by pump 28. When set to drive the ram downward, pressure is imposed on conduit 31 to top port 25 and suction is imposed on conduit 32 to bottom port 27. While a reservoir 45 for hydraulic fluid is provided, (FIG. 3), the preponderance of fluid employed in driving the ram is recirculated between the portions of the cylinder 11 above and below the piston 12.

Figure 3:
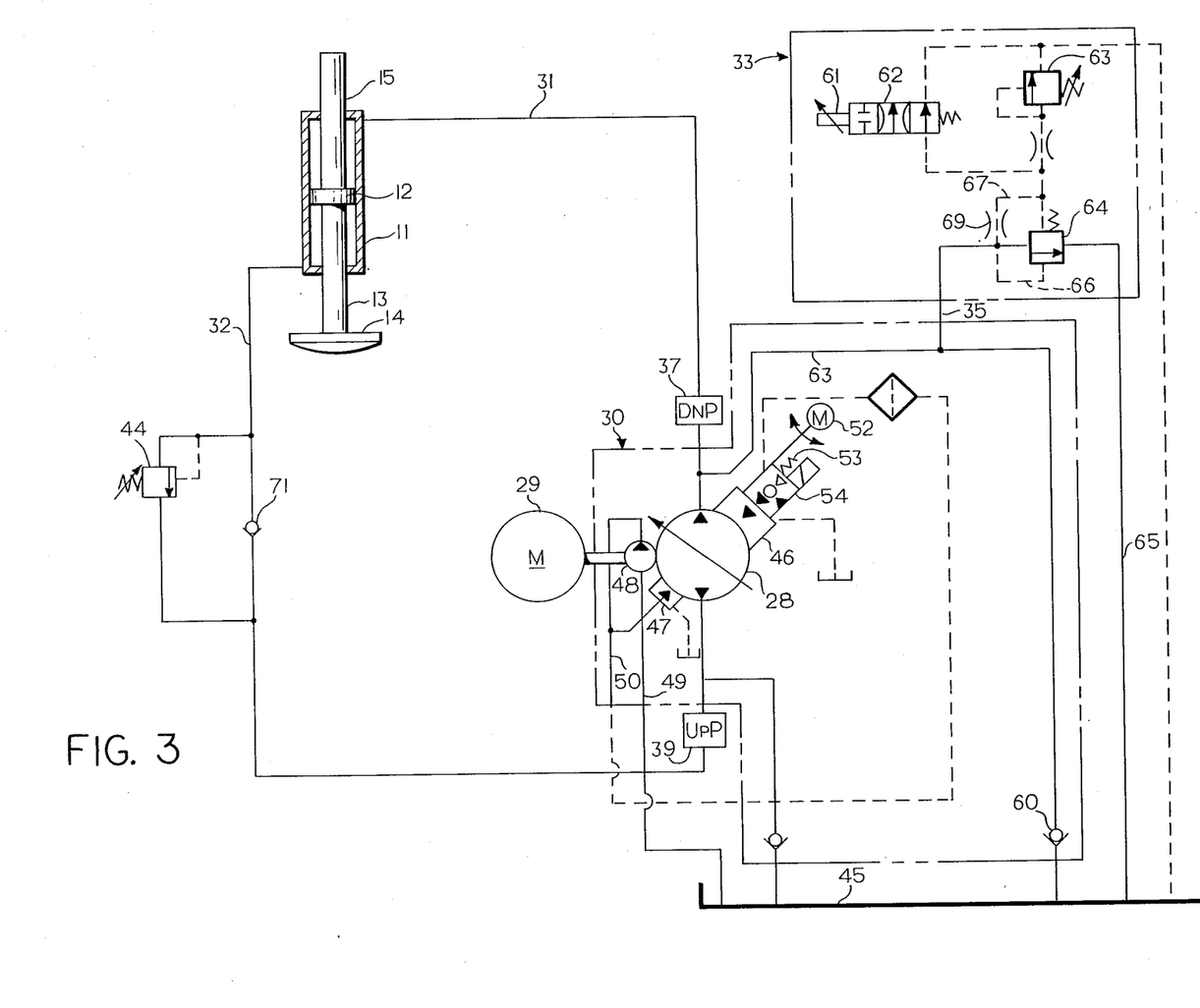
FIG. 3 is a schematic hydraulic diagram illustrating the hydraulic control system.

The hydraulic circuit also includes a proportional pressure control operator 33 arranged to control pressure on the ram drive lines by bleeding excess fluid to the reservoir 45. Thus a pressure control conduit 35 from the top conduit 31 communicates with proportional pressure control operator 33. A microprocessor 34 controls the ram motion and pressure. It issues pressure command signals through a pressure control amplifier 36 which sums those signals with pressure signals on the down pressure side of the ram drive as sensed by down pressure transducer 37 (FIG. 3).

Pump servo controls 30 are controlled by signals from a servo amplifier 38. Command signals from microprocessor 34 and feedback signals from a linear variable differential transformer (not shown) in the pump servo controls, arranged to sense the position of the pump slideblock and thus the pump stroke, are summed in servo amplifier 38 to produce the signals which control slideblock position.

Microprocessor 34 issues command signals to servo amplifier 38 calling for ram speeds in response to ram position signals from linear displacement transducer 18. It issues command signals for ram pressure rates of change, ram pressure and the shift from ram speed control to ram pressure control in response to down pressure signals from down pressure transducer 37. It can also receive up pressure signals from up pressure transducer 39 for indication and display of up pressure as on display 40 of terminal 41. Alternatively pressure transducer 39 can be connected with suitable interfacing to indicators and curve plotters (not shown). Terminal 41 includes a keyboard 42 to call up instructions, press parameter displays, operating and set up data and calibration data, to change programs in the microprocessor, or to change parameters within programs. Additional communication means with microprocessor 34 include a thumbwheel switch 43 which is available to machine attendants to adjust final pressing pressure of the ram and, where appropriate, other terminals or supervisory or production monitoring computers (not shown) including the process controller for the faceplate production shop.

Figure 2:
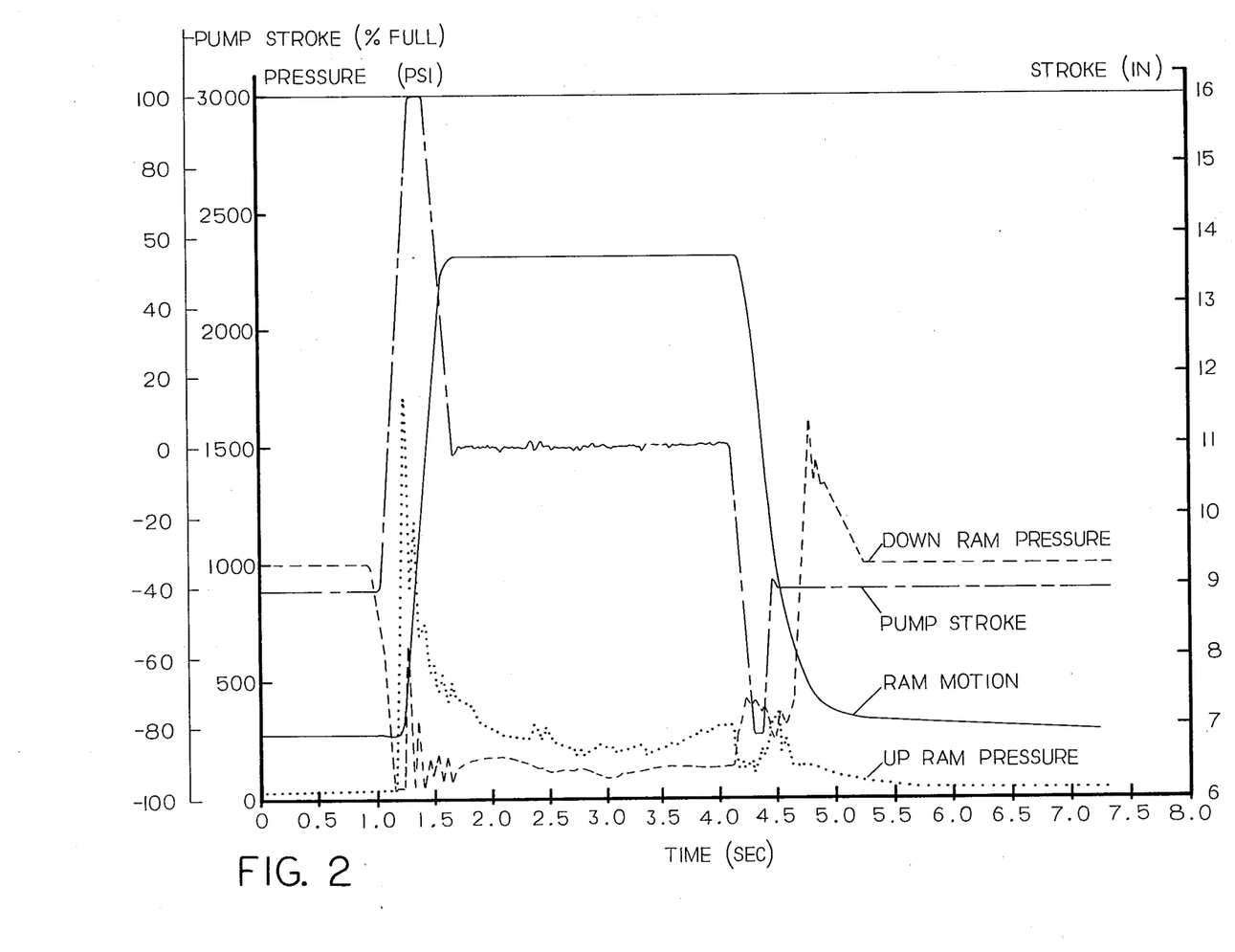
FIG. 2 is a plot of a pressing cycle for a typical CRT faceplate showing ram motion, ram down pressure, ram up pressure and pump stroke all against time.

The control functions to produce high quality CRT glass faceplates at high production rates are disclosed in graphic form in FIG. 2. The functions shown are for a twenty-five inch faceplate and will vary with different shapes and sizes, although the general form may be utilized for all such shapes and sizes. The solid line represents ram position. The curves represent only the dynamic portions of the pressing cycle and do not represent the pressing dwell time in its entirety. For example, in the case of a twenty-five inch faceplate, about four and one half gobs are fed per minute or a gob every thirteen and one third seconds. Only the eight seconds in which the ram is retracted from a pressed faceplate and advanced into the next gob to be pressed is set forth in the curves. Thus the terminal portion of a pressing dwell is shown in the first 1.2 seconds of FIG. 2. Rapid retraction of the ram from the pressing position to withdraw the plunger from the glass and clear the pressing table for its index motion to introduce the next gob charged mold into the pressing station consumes about four tenths of a second for the six and one half inches of ram retraction. Ram retraction is in an open loop speed control instituted by the shop controller (not shown) through the pressing control microprocessor 34. Retraction at high speed is switched to a slow down pattern at about 1.4 seconds. The ram is held at the top of its operation stroke for an interval in which the pressing table is indexed from about 1.6 seconds to 4.1 seconds. Its pressing stroke is then initiated by accelerating to a high speed until a first position of advance is reached at about one and a half inches from the top. Next a moderate speed is set and maintained to a second position at about two and one half inches from the top. A third slow speed is called for and deceleration to that speed initiated at about three and one half inches from the top so that the ram slows to and continues at that slow speed from a position about two inches above the bottom of its stroke until the hydraulic pressure required to continue at that speed reaches a switch-over threshold.

At the pressure switch-over threshold, the ram control shifts from an open loop speed control to a closed loop pressure control. This occurs at the peak down pressure of the dashed curve, shown at about 1600 p.s.i. and at time 4.8 seconds. The ram at this point is about one half inch from its final pressing position and has advanced the plunger into the gob charged in the female mold sufficiently to have filled the viewing face portion of the cavity between the mold and plunger. Thus, this portion of the cavity has glass distributed while the ram is moving at a constant speed thereby avoiding optical distortion in the viewing face regions due to changes in ram speed or pulses in pressing pressure incidental to control valve operation. Under the closed loop pressure control, the ram continues to approach its final pressing position generally asymptotically in one or more stepped rates of reduction of pressing pressure to a final pressing pressure, 1000 p.s.i. in the example, which is maintained throughout the pressing dwell interval.

Ram pressure in the down driving side of the cylinder, that above the piston, is plotted as the dashed line in FIG. 2 and can be correlated to ram displacement as noted above. During pressing dwell the down pressure is at a constant value, 1000 p.s.i. At the end of the pressing dwell interval down pressure is removed and falls essentially to zero. During the retraction of the ram the abrupt reversal of the pump and operation of the valves causes some instability in the down pressure represented by the spikes over the interval 1.25 seconds to 1.7 seconds. Low level pressure variations are shown across the interval, the ram is at its raised position and pressure builds slightly as the ram is extended. When the plunger enters the gob of glass down pressure begins to build since the ram is under a constant speed control. This pressure increase occurs at about 4.6 seconds on the plot. Under constant speed, the pressure builds smoothly as the plunger causes the glass to till the viewing portion of the cavity between plunger and mold and at the pressure switch-over threshold a rate of decrease of pressure is established and the pressure is reduced. Pressure rate reduction is generally constant or can be in several steps of decreasing slope. Brief spikes in down pressure as at about 4.8 seconds occur as a result of the reaction of the valve of the proportional pressure control operator 37 in switching from a full off condition to that establishing the rate of pressure reduction. The pump 28 is maintained at a constant stroke during the reducing pressure interval and excess hydraulic fluid is dumped to the fluid reservoir to maintain the rate of pressure reduction. When the dwell pressing pressure is reached, the pressure control maintains that pressure as shown beginning at about 5.25 seconds.

Pressure on the up side of piston 12, the bottom portion of the cylinder, is depicted as the dotted line in FIG. 2. It is at essentially zero during the terminal portion of pressing dwell and rapidly rises to about 1700 p.s.i. following the pressing control microprocessor signal to withdraw the plunger from the glass. Retraction control is by speed/position control. The up pressure declines from its peak with intermittent spikes introduced by the pump reversal and valve operation followed by slowdown control near the upper limit of the ram stroke until at the top of the ram stroke a low ram up maintenance pressure is imposed to hold the ram in position. Upon initiation of the down stroke of the ram, up pressure drops from its holding value and then fluctuates during the downward advance of the ram due to the shifting of the pump and is dampened by the counterbalance valve. In the reduced rate of the terminal pressure controlled ram motion, the up pressure has a low level transition approaching zero pressure for the pressing dwell period which is a smooth decline due to resistance of the glass to ram motion.

Radial piston pump 28 is controlled in its output by the position of a slide block which effectively provides a continuum of stroke lengths and thus volume rates of output. Pump stroke is shown in FIG. 2 as a dot-dash line which illustrates its relation to ram position and down and up pressures applied to the ram. When the slide block is in the neutral position, shown as zero stroke, essentially no pressure is imposed for either up or down displacement of the ram. In the period the ram is held in its raised position, the fluctuations from a zero percent stroke of the pump represent the corrective holding forces which prevent drift of the ram from that position. During the terminal portion of pressing dwell, the pump stroke, the slide block, is at forty percent negative to develop the 1000 p.s.i. down pressure. Upon termination of pressing dwell, the stroke is rapidly shifted through zero to a positive one hundred percent stroke to lift the ram at its maximum rate. Slowdown of the retracting ram is initiated by shifting toward a zero percent stroke. When the shop process controller signals for a pressing operation, the pump stroke is shifted from zero to about eighty percent negative at its maximum rate. Under position control, when the ram reaches its first down speed control position, the change in pump stroke is terminated and ram speed is maintained. At a second down velocity control position, pump stroke is shifted toward its pressing dwell position of forty percent negative and held at that value throughout dwell to cause the ram to decelerate to a constant slow speed downward prior to entry of the plunger into the glass. Thereafter, the pressing of the glass is under pressure control.

The system of FIG. 1 achieves the control pattern of ram displacement and pressing pressure by electrohydraulic control to control pump stroke through control of slide block position in the pump and control of proportional pressure control operator 33 to bleed hydraulic fluid to the reservoir to maintain the pressure called for. As shown in FIG. 3, the hydraulic system is made up of four main elements, the ram assembly, the counterbalance valve 44, the electronically porportional pressure control valve 33 and the two-way radial piston pump 28 with its servo controls 30. With the motor running to drive the pump rotor and the system under pressure control for a pressing dwell condition, as shown at time zero of FIG. 2, the microprocessor issues a signal to the servo amplifier 38 calling for a forty percent negative stroke setting by the torque motor and a down pressure of 1000 p.s.i. to the pressure control amplifier 36.

The primary elements of the hydraulic system for the glass pressing operation are shown schematically in FIG. 3 without their auxiliary hydraulic elements such as the fluid temperature conditioning means, filters and make up fluid pump or the various pressure relief valves. Fluid paths corresponding to those of FIG. 1 bear similar reference characters in FIG. 3. The two way radial piston pump 28 has a slide block for stroke control which is positioned hydraulically by a control piston 46 and an opposing piston 47 both of which are driven by pilot hydraulic fluid from a pilot pressure gear pump 48 having a suction line 49 to fluid reservoir 45 and an output line 50. Branch 51 between line 50 and piston 47 provides fluid to develop the opposing force on slide block. Absent control, the larger area control piston 46 overcomes the opposing piston 47 and displaces the slide block from its neutral or zero stroke position. Each of pistons 46 and 47 have return paths to reservoir 45. An electrohydraulic torque motor 52 which has a center position toward which it is biased by spring 53 drives servo valve 54 to control the flow of pilot fluid to and from the control and opposing pistons such that when one is subject to displacement pressure the other is open to drain. The position of the slide block is sensed by a linear variable differential transformer (not shown). Servo amplifier issues signals of a magnitude proportional to the signal from the microprocessor and the feedback signal representing slide block position as issued by the linear variable differential transformer. These signals are applied to the torque motor to control the fluid flow through the servo valve and thus the position of the pump slide block.

The microprocessor 34 is shown in FIG. 1 coupled to the servo amplifier 38 through leads 55 and 56 as the means of controlling pump stroke according to a pattern as shown in FIG. 2. Microprocessor 34 also provides pressure control through signals applied through lead 57 to pressure control amplifier 36 in accordance with programmed signals and feedback signals from down pressure transducer 37 on lead 58. Pressure control amplifier sums the pressure command and the feedback pressure signal and issues a controlling signal on lead 59 to the pressure control operator 33 at solenoid 61 of electronic control valve 62 within operator 33.

Closed loop pressure control is instituted in the microprocessor processor 34 when the threshold pressure is sensed in down pressure transducer 37 by the issuance of controlling signals through amplifier 36 to operator 33. Down pressure on line 31 is communicated through line 63, the suction line to the fluid reservoir 45 through check valve 60, to pressure control line 35. Prior to the institution of pressure control, valve 62 is closed. Valve 62 is a proportioning valve having a continuum of portings from fully close to fully open depending upon the current flowing in operator solenoid 61. At full current the valve is fully closed. The pressure control amplifier 36 applies a current reduced from full value in inverse proportion to the degree of porting required. Valve 63 is a normally closed manual override which is employed as a safety to open before pressures which would open the internal relief valves in the pump are achieved. Main pressure control valve 64 is spring biased closed so that line 65 to reservoir 45 is closed.

With valve 62 closed, pressure on pilot lines 66 and 67 is equal so that spring biasing controls valve 64. Pilot line 67 is cut off at valves 62 and 63. A pressure control signal to solenoid 61 displaces valve 62 to adjust its porting permitting a pressure drop in line 67 so that the bias spring force of valve 64 is overcome by the pressure in line 66 to open the valve and bleed fluid from line 31 to line 65 and the reservoir 45. As the pressure drop in line 31 is sensed at transducer 37, pressure control operator 33 adjusts its signal to adjust the porting at electronic control valve 62 thereby adjusting the porting of valve 64 and the pressure in line 31. This action is dampened by the orifice 69 in line 67. In the pattern of down pressure shown in FIG. 2 the microprocessor issues a declining ramp signal in response to the switchover pressure which calls for a constant rate of declining pressure. The initial porting of the valves results in an abrupt pressure drop and a pressure recovery spike. The ramp signal from microprocessor 34 assumes control of proportional pressure control operator 33 rapidly and thereafter the rate of decline of pressure follows the ramp signal as illustrated over the time interval 4.8 seconds to 5.25 seconds. At that time the down pressure has reached the 1000 p.s.i. pressure level as sensed by down pressure transducer 37 and its signal to microprocessor 34 to trigger a new pressure drop rate, zero in the example, where 1000 p.s.i. is to be maintained. Hence the microprocessor maintains a signal calling for 1000 p.s.i. and a signal calling for a negative forty percent pump stroke so that the pressing motion of the plunger and ram tails off to its final pressing dwell position of seven inches on the scale selected for the illustrative case of FIG. 2.

It is contemplated that the microprocessor can be programmed to call for predetermined stepped rates of change of declining pressure in this system and can be programmed to trigger such rates at successively lower threshold pressure levels subsequent to the attainment of the switch-over pressure. Such rates of declining pressure can increase or decrease according to the program of the microprocessor 34 although at present it is considered desirable that if changed rates are to be employed, the subsequent rates should be decreased.

Counterbalance valve 44 opens by line pressure on a down stroke and dampens pressure fluctuations in the down line. On an up stroke valve 44 is bypassed by check valve 71.

In the system as disclosed, up pressure transducer 39 is not a control element although it provides an indication of system operation as shown in FIG. 2.

Figure 4:
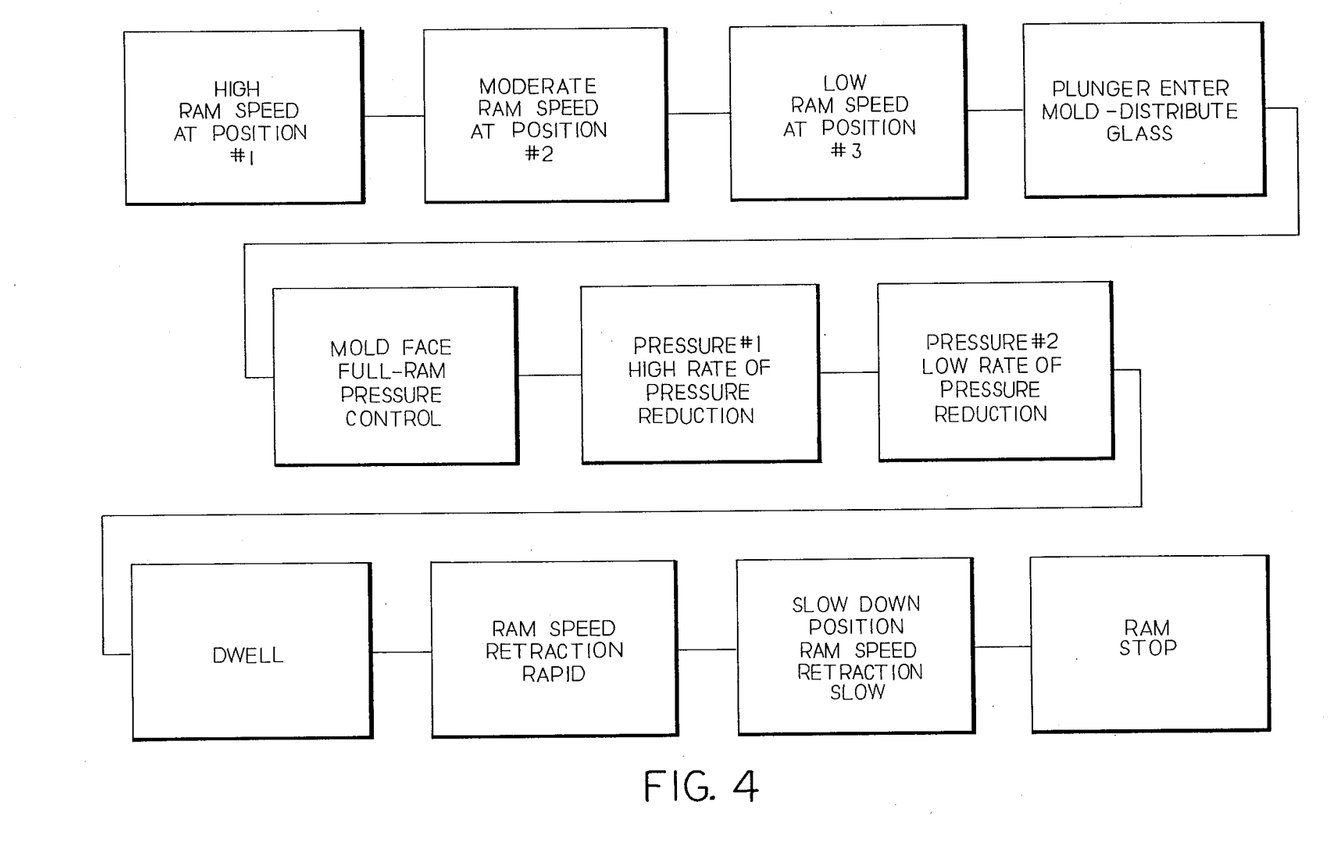
FIG. 4 is a flow chart of the glass faceplate pressing cycle of this invention.

When the servo controller receives a ram down signal through the microprocessor 34 from the shop process controller, it follows the program as shown in FIG. 4. The microprocessor 34 issues a high speed down signal at the first or #1 position shown as at 4.1 second on FIG. 2 and the ram begins to move downward. As the ram reaches position #2, sensed by position transducer 18, the signal to the microprocessor on leads 79 and 81 shifts the speed setting signal transmitted from the microprocessor to the servo amplifier 38 so that its summed signal to the pump servo calls for a lower speed until a position #3 is achieved. At position #3 a low speed is called for and the pump stroke adjustment is made to the value which will be maintained throughout the balance of down travel of the ram and the pressing dwell interval. Position #3 is set far enough from the upper surface of the molten glass charge in mold 26 that ram speed has completed its transition to a constant low speed at the time the plunger 14 encounters the glass charge and it therefore continues at that speed into the charge to distribute it across the viewing area portion of the mold and plunger. Such advance into the glass causes the down pressure on the plunger to increase as sensed at down pressure transducer 37 so that the signal indicating pressure is transmitted to the microprocessor 34. When the pressure reaches a predetermined level, a level chosen to assure that molten glass has been distributed throughout the viewing area of the faceplate cavity between the plunger and mold, the ram control by the microprocessor is shifted from an open loop speed control based upon ram position to a closed loop pressure control based upon down ram pressure.

In the pressure control mode illustrated two steps of rate of reduction are illustrated in FIG. 4. An initial rate of reduction of pressure is established which is relatively high as by a ramp signal from the microprocessor 34 to the pressure control amplifier 36. This high rate of pressure reduction is summed with the down pressure feedback signal from transducer 37 in pressure control amplifier and the resultant signal issued to proportional pressure control operator 33 to control down pressure on the ram according to the command signal. At a given pressure level below the threshold at which the first pressure reduction rate was set, a second low pressure reduction rate is established by the microprocessor 34 and the operator shifts to control down pressure on the ram at that low rate. It has been found that a single rate of declining pressure as shown in FIG. 2 provides the improved results of this invention for many faceplate sizes and forms. When pressure has reached a dwell pressing pressure established in the microprocessor, the signal to operator 33 calls for that pressure continuously and the amplifier maintains closed loop control at that pressure by the resultant signal from the sum of the signal fed back from pressure transducer 39 and that called for by the microprocessor.

The end of the dwell period determined by the shop process controller shifts control to open loop speed control. The microprocessor calls for high speed withdrawal of the plunger from the pressed glass by shifting the pump slide block and thus pump stroke to impose up pressure on the ram. At a slowdown position from the upper limit of ram stroke sensed at transducer 18, the microprocessor commands a deceleration and shifts pump stroke towards its neutral or zero stroke position to slow ram retraction to zero at the top of the stroke and to hold that condition until the next ram down signal is issued.

Great flexibility is afforded by the microprocessor control. Depending upon signal storage capacity and equipment capacity, a number of pressing programs for different sizes and shapes of faceplates can be stored so that they can be called up readily and will define consistent and reproducible patterns of ram control when they are called for. Within any given control program parameters such as ram position, speed, deceleration, pressure, and rate of change of pressure, can be individually and in many instances independently changed. These program selections, the operating parameters dictated by the program, and changes in program or parameters can all be effected at a terminal either at or remote from the shop. Such a terminal 41 is represented by the display 40 and keyboard 42 for display and call up/inputting the microprocessor 34 through leads 81 and 82.

Machine attendants or operators have control of pressing dwell pressure through a group of thumbwheel switches 43 which directly input the microprocessor program currently in effect over lead 83. Changes in that pressing pressure may be dictated by observed characteristics of the ware being pressed. For example, if ware is overpressed so that glass is extruded from between the mold and plunger, a reduced pressure may be desired, or where glass is torn off along the inside surface of the faceplate flanges near the seal edge, known as "mill out", lower pressure tends to mitigate this fault, or if glass is not completely distributed through the cavity between the mold and plunger higher pressure may solve this problem. Such pressure changes can be made on the present system by the attendant machine operator without altering the other pressing parameters discussed.

It is to be understood that the electrical, hydraulic and electrohydraulic components of the system disclosed are commercially available and that this invention should not be read as limited to the components disclosed or the specific relationships set forth. One of ordinary skill in the art might achieve the beneficial features of the present invention with alternatives both as to the components and their interrelationships without departing from the spirit or scope of the invention. Therefore the above disclosure should be read as illustrative and not in a limiting sense.

What is claimed:

1. In a press for cathode ray tube faceplate comprising a ram, a plunger for faceplates on said ram, a femal mold for faceplates in registry with said plunger at the limit of pressing travel of said plunger; means to transfer said ram between a position in which said plunger is retracted from said female mold and a position in which said plunger is in glass pressing relationship to said female mold, a control for said ram advance from the retracted toward the glass pressing position at an initial open-loop pressure control at a high rate of advance, means to reduce the rate of advance as said plunger approaches the glass pressing position, and means to maintain the advance as the plunger makes initial contact with glass in the female mold the improvement comprising; means responsive to ram pressing pressure of a magnitude sufficient to assure that the viewing face region of said plunger and female mold are completely filled with glass to initiate a step of pressure adjustment on said ram, the initial pressure adjustment comprising a reduction of pressure; said pressure adjustment including the progressive reduction of said ram pressing pressure at a constant rate to a second predetermined ram pressing pressure said means including a closed loop pressure control; and means responsive to said second predetermined ram pressing pressure to maintain said ram and plunger at said second predetermined pressing pressure by closed loop pressure control.

2. In a press according to claim 1, the further improvement comprising a control having plural steps of reduction of rate of advance of said ram as a function of the position of the ram along its travel.

3. In a press according to claim 1, the further improvement of a ram retraction control and means to operate said control to retract said ram at a speed as a function of ram position, said speed being high relative to rates of advance of said ram.

4. In a press according to claim 1, the further improvement of a programmable controller which render the length of ram stroke, the rate of ram motion, the rate of ram pressure change, and the inflection points at which said rate of motion and pressure are change for said ram advance control selectively adjustable, whereby an individual attending said press may selectively alter the control by said programmable controller of the ram stroke, rates of ram motion and rate of pressure change and inflection points of ram position and pressing pressure for changes in ram motion and pressure.

5. The method of pressing a cathode ray tube faceplate comprising advancing a pressing plunger toward a molten glass charged mold at a first high rate; reducing the rate of advance of the plunger to a low rate at a predetermined position spaced from the molten glass; advancing the plunger into the molten glass at a constant speed until the cavity between the mold and plunger which defines the viewing region of the face plate is filled with molten glass; establishing a declining controlled pressure on the plunger after the cavity between the mold and plunger which defines the viewing region of the faceplate is filled, the filling of said cavity being determined as a predetermined pressure function applied to the plunger, and thereafter maintaining a controlled pressure on the plunger until the glass charge between the plunger and mold has solidified to a stable form, the constant speed advance of the plunger being terminated as the controlled pressure is established.

6. A method according to claim 5 wherein the declining controlled pressure is declining at a uniform rate between two predetermined spaced pressure values on the plunger.

* * * * *